(12) United States Patent
Choi et al.

(10) Patent No.: US 7,515,790 B2
(45) Date of Patent: Apr. 7, 2009

(54) TWO-DIMENSIONAL PLANAR PHOTONIC CRYSTAL SUPERPRISM DEVICE AND METHOD OF MANUFACTURING THE SAME

(75) Inventors: Choon Gi Choi, Daejeon (KR); Young Tak Han, Daejeon (KR); Jin Tae Kim, Daejeon (KR); Woo Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/974,635

(22) Filed: Oct. 15, 2007

(65) Prior Publication Data

US 2008/0112669 A1  May 15, 2008

(30) Foreign Application Priority Data

Nov. 9, 2006 (KR) .................. 10-2006-0110728
Jun. 5, 2007 (KR) .................. 10-2007-0054852

(51) Int. Cl.
*G02B 6/10* (2006.01)
*G02B 6/34* (2006.01)
*G02B 5/04* (2006.01)

(52) U.S. Cl. .................. 385/36; 385/14; 385/129; 385/130; 359/831; 359/833

(58) Field of Classification Search .......... 385/14, 385/36, 129–132; 438/31; 359/831, 833; 430/5

See application file for complete search history.

(56) References Cited

U.S. PATENT DOCUMENTS 6,175,671 B1   1/2001   Roberts (Continued)

FOREIGN PATENT DOCUMENTS

JP   2005-156674   6/2005

(Continued)

OTHER PUBLICATIONS

Lijun Wu et al., "Superprism Phenomena in Planar Photonic Crystals", IEEE Journal of Quantum Electronics, vol. 38, No. 7, Jul. 2002, 0018-9197/02, 2002 IEEE, pp. 915-918.

(Continued)

*Primary Examiner*—Sung H Pak
*Assistant Examiner*—Daniel Petkovsek
(74) *Attorney, Agent, or Firm*—Blakely, Sokoloff, Taylor & Zafman LLP

(57) ABSTRACT

Provided are a two-dimensional planar photonic crystal superprism device and a method of manufacturing the same, in which a manufacturing process is simplified using a nanoimprint lithography technique, and thus price-reduction and mass production are facilitated. The two-dimensional planar photonic crystal superprism device includes: a single-mode input waveguide comprising a straight waveguide having a taper structure and a bending waveguide; a superprism formed on an output end side of the single-mode input waveguide and comprising a slab and a photonic crystal superprism; and a single-mode output waveguide comprising a straight waveguide having a taper structure and a bending waveguide, and formed adjacent to the photonic crystal superprism. Using the two-dimensional planar photonic crystal superprism device, it is possible to facilitate manufacturing of nano-photonic integrated circuits, photonic crystal integrated circuits and nano-photonic systems. In addition, a wavelength-selectable photonic crystal superprism device using high dispersion of photonic crystal, which is several hundred times the dispersion of conventional glass prism, can be manufactured using thermal/hot and ultraviolet nanoimprint lithography techniques corresponding to nano-manufacturing technology.

5 Claims, 8 Drawing Sheets

U.S. PATENT DOCUMENTS

| | | |
|---|---|---|
| 6,366,392 B1 | 4/2002 | Tokushima |
| 6,560,006 B2 | 5/2003 | Sigalas et al. |
| 6,735,368 B2 | 5/2004 | Parker et al. |
| 2006/0024011 A1* | 2/2006 | Enokido ............... 385/129 |
| 2006/0119853 A1* | 6/2006 | Baumberg et al. ......... 356/445 |

FOREIGN PATENT DOCUMENTS

| | | |
|---|---|---|
| KR | 1020030080691 A | 10/2003 |
| KR | 1020040084325 A | 10/2004 |
| KR | 1020050075580 A | 7/2005 |
| KR | 1020050075581 A | 7/2005 |
| KR | 1020050090839 A | 9/2005 |

OTHER PUBLICATIONS

Hideo Kosaka et al., "Superprism Phenomena in Photoonic Crystals: Toward Microscale Lightwave Circuits", Journal of Lightwave Technology, vol. 17, No. 11, Nov. 1999, 0733-8724/99, 1999 IEEE pp. 2032-2038.

T. Stomeo, et al., "Fast Nanopatterning of Two-Dimensional Photonic Crystals By Electron Beam Lithography", Superlattices and Microstructures 36 (2004) 265-270, 0749-6036/2004 Elsevier Ltd., doi:10.1016/j.spmi 2004.08.019.

M. De Vittorio et al., "Two-dimensional photonic crystal waveguide obtained by e-beam direct writing of SU8-2000 photoresist", Science Direct, Microelectronic Engineering 73-74 (2004) 388-391, 0167-9317/2004 Elsevier B. V., doi:10.1016/j.mee.2004.02.075.

W. Bogaerts et a., "SOI nanophotonic waveguide structures fabricated with deep UV lithography", Science Direct, Photonics and Nanostructures—Fundamentals and Applications 2 (2004) 81-86, 1569-4410/2004 Published by Elsevier B. V. doi:10.1016/j.photonics.2004.07.002.

\* cited by examiner

TWO-DIMENSIONAL PLANAR PHOTONIC CRYSTAL SUPERPRISM DEVICE AND METHOD OF MANUFACTURING THE SAME

CROSS-REFERENCE TO RELATED APPLICATION

This application claims priority to and the benefit of Korean Patent Application Nos. 2006-110728, filed Nov. 9, 2006, and 2007-54852, filed Jun. 5, 2007, the disclosures of which are incorporated herein by reference in their entirety.

BACKGROUND

1. Field of the Invention

The present invention relates to a two-dimensional planar photonic crystal superprism device and a method of manufacturing the same, and more particularly, to a two-dimensional planar photonic crystal superprism device and a method of manufacturing the same using a thermal/hot and ultraviolet (UV) imprint lithography technique that is nano-manufacturing technology. In other words, the present invention relates to a method of manufacturing a two-dimensional planar photonic crystal device used as a medium for transferring light using a polymer and a silicon-on-insulator (SOI) material, and more particularly, to a two-dimensional planar photonic crystal device, i.e., a superprism device, formed by patterning a rod or hole structure at intervals and a method of manufacturing the same.

2. Discussion of Related Art

In general, a photonic crystal denotes an artificial structure in which a refractive index is spatially changed according to a period corresponding to an optical wavelength. Typical properties of photonic crystals are photonic band gap, high non-linearity and dispersion. Among the properties of photonic crystals, the photonic band gap indicates a frequency range in which light does not propagate into the photonic crystal but is completely reflected, because light causes multiple reflection due to periodical change in refractive index. Around the photonic band gap, dispersion is strongly distorted and peculiar phenomena which do not arise in a conventional uniform medium may occur, for example, a superprism phenomenon, a phenomenon of light propagation being slowed, etc. A photonic crystal device is a nanophotonic device using the photonic crystal having the properties of photonic band gap, light localization, non-linearity and high dispersion.

Using a photonic band gap among the properties of photonic crystal, it is possible to manufacture a photonic crystal diode, an omnidirectional mirror, etc. Using light localization, it is possible to manufacture a photonic crystal laser, a waveguide, a filter, a photonic crystal fiber, etc. Using the superprism phenomenon, it is possible to manufacture a wavelength division multiplex (WDM) disperser, etc. Using the non-linearity, it is possible to manufacture a microminiature polariscope, etc. The photonic crystal device shows very high efficiency in comparison with a conventional optical device because the period of photonic crystals is shorter than a handling wavelength, and effects of photonic crystals can be sufficiently obtained over 7 to 8 periods. In addition, individual photonic crystal devices can be organically combined and integrated with ease because they have a very small size of several to several tens of microns. Consequently, the photonic crystal device is very advantageous for constituting a new photonic crystal integrated circuit and a nano-photonic system.

The technology for manufacturing a photonic crystal device uses a nanolithography technique, such as deep UV lithography used to manufacture a semiconductor device, e-beam lithography, etc., anodization that is an electrochemical method, a chemical method using self-assembly material, dry etching, etc., on high-permittivity material such as SOI, GaAs, InP, etc. However, according to such methods, the process is complex, and the number of process steps increase, thus creating a problem of inefficiency in that much time is taken to manufacture a photonic crystal device. In addition, since it is difficult to manufacture a large sized integrated photonic crystal device, mass production is not easy.

SUMMARY OF THE INVENTION

The present invention is directed to a two-dimensional planar photonic crystal superprism device and a method of manufacturing the same that save time by simplifying a process which is difficult to simplify with a pattern fabrication technique used in conventional semiconductor technology, thereby enabling mass production and price-reduction.

The present invention is also directed to a two-dimensional planar photonic crystal superprism device and a method of manufacturing the same, that enable price-reduction by mass production using thermal/hot and ultraviolet (UV) imprint lithography techniques corresponding to nano-manufacturing technology.

One aspect of the present invention provides a two-dimensional planar photonic crystal superprism device, comprising: a single-mode input waveguide comprising a straight waveguide having a taper structure and a bending waveguide; a superprism formed on an output end side of the single-mode input waveguide and comprising a slab and a photonic crystal superprism; and a single-mode output waveguide comprising a straight waveguide having a taper structure and a bending waveguide, and formed adjacent to the photonic crystal superprism.

The superprism may comprise: a silicon substrate; a lower clad layer formed of a polymer on the silicon substrate; a core layer formed on the lower clad layer, formed of a high-refractive-index polymer having a higher refractive index than the lower clad layer, and having a photonic band gap lattice structure including a plurality of air holes; and an upper clad layer formed on the core layer, and formed of a low-refractive-index polymer having a lower refractive index than an air layer or the core layer.

The lower clad layer may be a polymer layer having an air-hole structure or a low-refractive-index polymer layer having a slab structure, and the polymer constituting the lower clad layer may have the same refractive index as or a different refractive index from the low-refractive-index polymer constituting the upper clad layer. The high-refractive-index polymer may have a refractive index of 1.4 to 1.8, and the low-refractive-index polymer may have a refractive index of 1.0 to 1.5.

The photonic band gap lattice structure may have a hexagonal lattice arrangement, and the air holes may be filled with an air layer or the low-refractive-index polymer. The air holes may be formed by a nanoimprint lithography process.

Meanwhile, the lower clad layer may be formed of silicon oxide, and the core layer may be formed of silicon having a higher refractive index than the lower clad layer.

Another aspect of the present invention provides a method of manufacturing a two-dimensional planar photonic crystal superprism device, the method comprising the steps of: forming a lower clad layer made of a polymer on a silicon substrate; forming a core layer made of a high-refractive index polymer having a higher refractive index than the polymer on the lower clad layer; forming a metal mask and a polymer layer for imprinting on the core layer; patterning the polymer layer for imprinting using a stamp or mold to form a mask pattern; forming a metal mask pattern using the mask pattern; and patterning at least one of the core layer and the lower clad layer to form a photonic crystal lattice pattern including a plurality of air holes.

In the step of forming a photonic crystal lattice pattern in the core layer and the lower clad layer, the photonic crystal lattice pattern may be formed by etching the core layer and the lower clad layer using the metal mask pattern, or the photonic crystal lattice pattern may be directly imprinted on the core layer and the lower clad layer using a nanoimprint lithography process in the step of forming a photonic crystal lattice pattern, a ratio of a diameter of the air holes to a distance between centers of adjacent air holes may be adjusted to be 55% or less. The ratio of a diameter of the air holes to a distance between centers of the adjacent air holes may be adjusted according to a size of the whole photonic crystal lattice pattern, a density of the pattern, and a size of the stamp or mold. The stamp or mold may be made of any one of metal, silicon, quartz and polymer.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Figure 1:
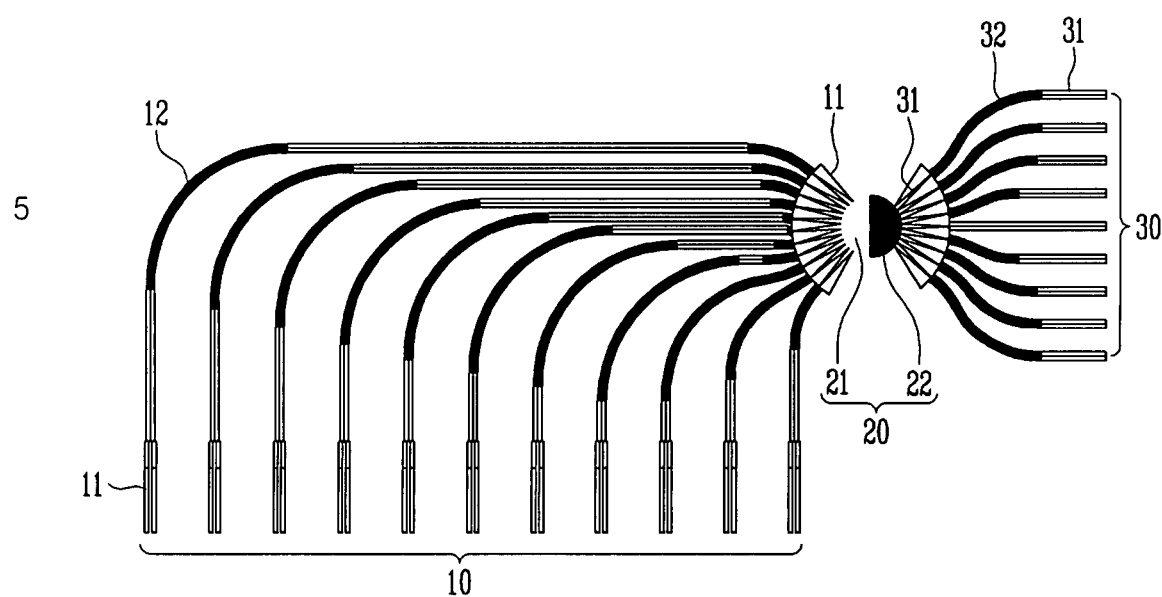
FIG. 1 is a schematic plan view showing the entire structure of a two-dimensional planar photonic crystal superprism device including input and output waveguides according to an exemplary embodiment of the present invention.

FIG. 1 is a schematic plan view showing the entire structure of a two-dimensional planar photonic crystal superprism device including input and output waveguides according to an exemplary embodiment of the present invention. Referring to FIG. 1, a two-dimensional planar photonic crystal superprism device 1 comprises single-mode input waveguides 10, a superprism 20, and single-mode output waveguides 30. In the two-dimensional planar photonic crystal superprism device 1, light waves are focused into a core layer and propagate in the horizontal direction by a two-dimensional photonic band gap (PBG) structure and in the vertical direction by a total reflection condition.

The single-mode input waveguides 10 includes taper-structure straight input waveguides 11 and bending waveguides 12, and the bending waveguides 12 are connected between the taper-structure straight input waveguides 11. The single-mode output waveguides 30 also include taper-structure straight output waveguides 31 and bending waveguides 32, and each of the bending waveguides 32 is connected between a pair of the straight output waveguides 31. Meanwhile, the superprism 20 that is the most remarkable component of the present invention comprises a slab 21 and a photonic crystal superprism 22 disposed in the output end side of the single-mode input waveguides 10.

As illustrated in FIG. 1, the input direction of the single-mode input waveguides 10 is perpendicular to the output direction of the single-mode output waveguides 30 in order to clearly measure light, which is input through the single-mode input waveguides 10, is dispersed by the superprism 20, and passes through the single-mode output waveguides 30. In addition, it prevents light transmitted through air from being measured together with light dispersed by the superprism 20 and output through the input and output waveguides 10 and 30 when the input and output waveguides 10 and 30 are on the same line.

When the two-dimensional planar photonic crystal superprism device 1 having the above-described structure is formed on the basis of a polymer, each of the straight input waveguides 11 and the straight output waveguides 31 constituting the single-mode input waveguides 10 and the single-mode output waveguides 30 has a width of 1.6 µm. The height of the single-mode input waveguides 10 and the single-mode output waveguides 30, i.e., the height of the photonic crystal superprism device 1, is about 0.93 µm (1.5a, where a denotes a lattice constant). Here, the lattice constant a denotes a distance between adjacent air holes included in the photonic crystal superprism 22. The single-mode input and output waveguides 10 and 30 are incident in a quasi transverse electric (TE)-like mode in which an electric field component exists in a propagation direction of electric waves, and satisfy a single-mode condition in a wavelength band between 1496 and 1586 nm. A mode converter is applied to input from a fiber disposed outside the device to the single-mode input waveguides 10. A coupling loss between the input waveguides 10 and the fiber is about 1.64 to 1.73 dB. In addition, the size of an optical mode input to the taper-structure input waveguides 11 is about 12.5 µm in a wavelength band between 1496 and 1586 nm, and the taper-structure output waveguides 31 also have a size in which light having an optical mode size of 12.5 μm can be received. The bending radius of the bending waveguides 12 and 32 constituting the input and output waveguides 10 and 30 may be large enough to prevent beating of input waves, and is 250 μm in this exemplary embodiment.

When the two-dimensional planar photonic crystal superprism device having the above-described structure is formed on the basis of silicon-on-insulator (SOI), which is a compound semiconductor, the straight input waveguides 11 and the straight output waveguides 31 constituting the single-mode input waveguides 10 and the single-mode output waveguides 30 each have a width of 0.5 μm. The height of the input waveguides 10 and the output waveguides 30, i.e., the height of the photonic crystal superprism device 1, is about 0.26 μm (0.8a, where a denotes a lattice constant). Here, the lattice constant a denotes a distance between adjacent air holes included in the photonic crystal superprism 22. The input and output waveguides 10 and 30 are incident in the quasi TE-like mode and satisfy a single-mode condition in a wavelength band between 1547 and 1556 nm. A mode converter is applied to input from a fiber disposed outside the device to the input waveguides 10. The size of an optical mode input to the taper-structure straight input waveguides 11 is about 3.5 μm in a wavelength band between 1547 and 1556 μm. The taper-structure straight output waveguides 31 also have a size for receiving light having an optical mode size of 3.5 μm. The bending radius of the bending waveguides 12 and 32 may be large enough to prevent beating of input waves, and is about 200 μm.

Figure 2A:
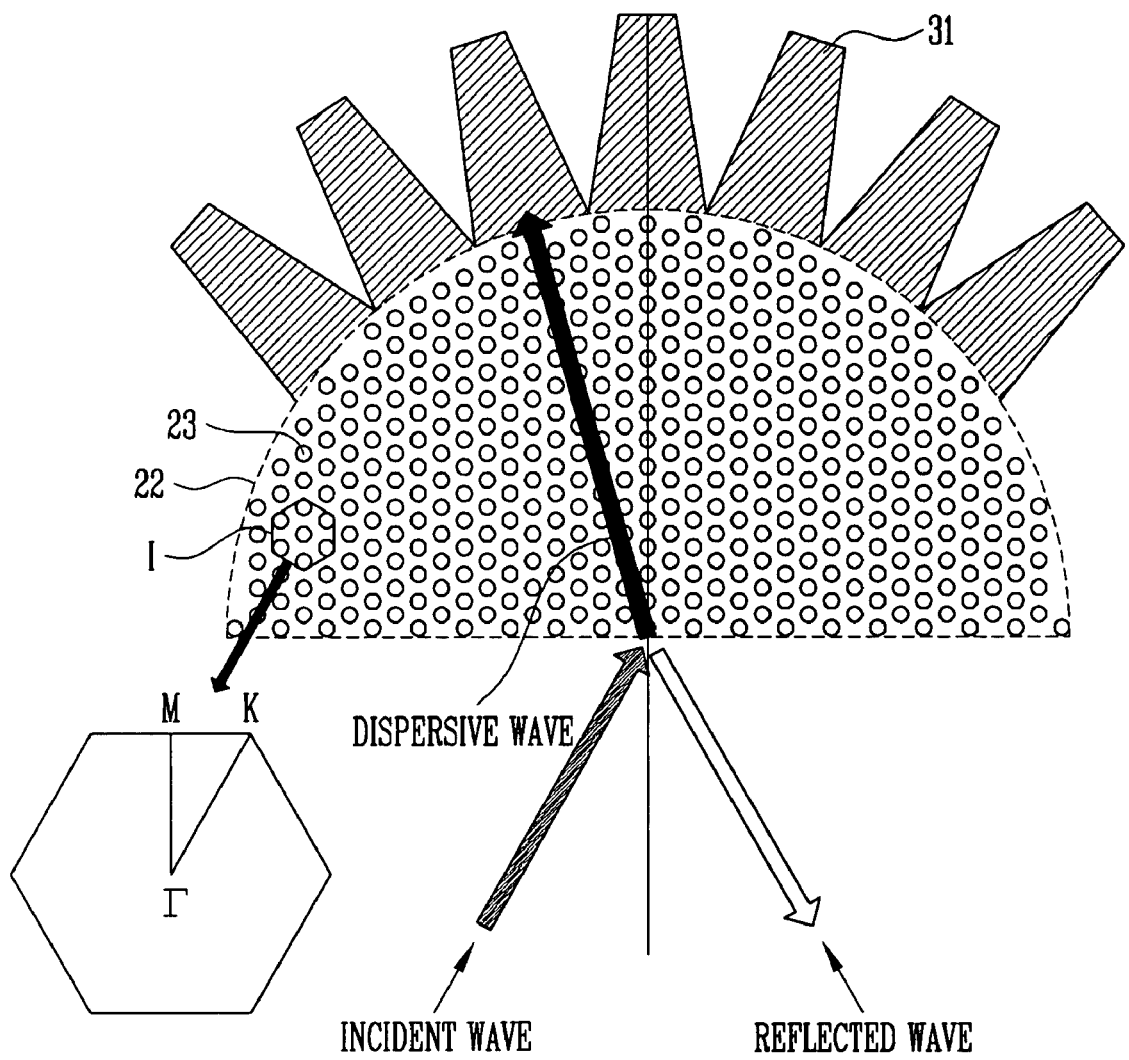
FIGS. 2A and 2B are enlarged plan views illustrating the structure and operation of the superprism shown in FIG. 1.
Figure 2B:
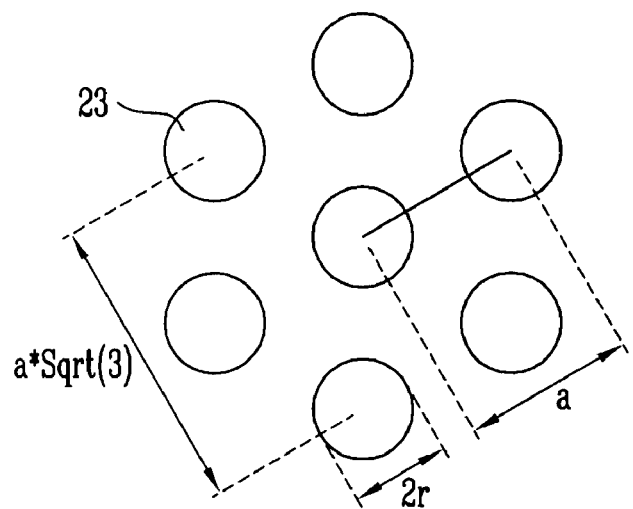

FIGS. 2A and 2B are enlarged plan views illustrating the structure and operation of the superprism shown in FIG. 1. More specifically, FIG. 2A illustrates the structure of the photonic crystal superprism shown in FIG. 1 and propagation directions of waves. According to FIG. 1, the superprism 20 has a slab structure and includes the slab 21 and the photonic crystal superprism 22. Referring to FIG. 2A, the photonic crystal superprism 22 includes a plurality of air holes 23, and the air holes 23 are formed in repeated hexagonal lattice array patterns I. The lattice array patterns denote the irreducible Brillouin zone indicating propagation directions of waves, and Γ, M and K shown in a hexagonal region indicate propagation directions of waves. To be specific, Γ, M and K indicate points corresponding to a triangular lattice in a reciprocal lattice space and denote propagation directions of waves based on the lattice.

FIG. 2B is an enlarged plan view of the region I, i.e., the hexagonal lattice array pattern of air holes, of FIG. 2A. As illustrated in FIG. 2B, the hexagonal lattice array pattern constituting the photonic crystal superprism 22 includes one air hole 23 in the middle and air holes 23 Surrounding the one air hole 23 in a hexagonal shape. Each of the air holes 23 has a radius of r, a distance between the centers of the adjacent air holes 23 is a (a lattice constant), i.e., the interval of the air holes 23, and a distance d (a width between line defects) between the two air holes 23 which are the farthest away from each other in the hexagonal lattice array pattern is a*sqrt(3). The air holes 23 are formed using thermal/hot and ultraviolet (UV) imprint lithography techniques, as disclosed in process descriptions below.

When incident waves are incident on the photonic crystal super-prism 22 having the above-described hexagonal lattice array pattern I, dispersive waves dispersed by the photonic crystal superprism 22 and reflected waves reflected at the end portion of the photonic crystal superprism 22 are generated. The dispersive waves dispersed by the photonic crystal superprism 22 are output through the output waveguides 30.

Figure 3:
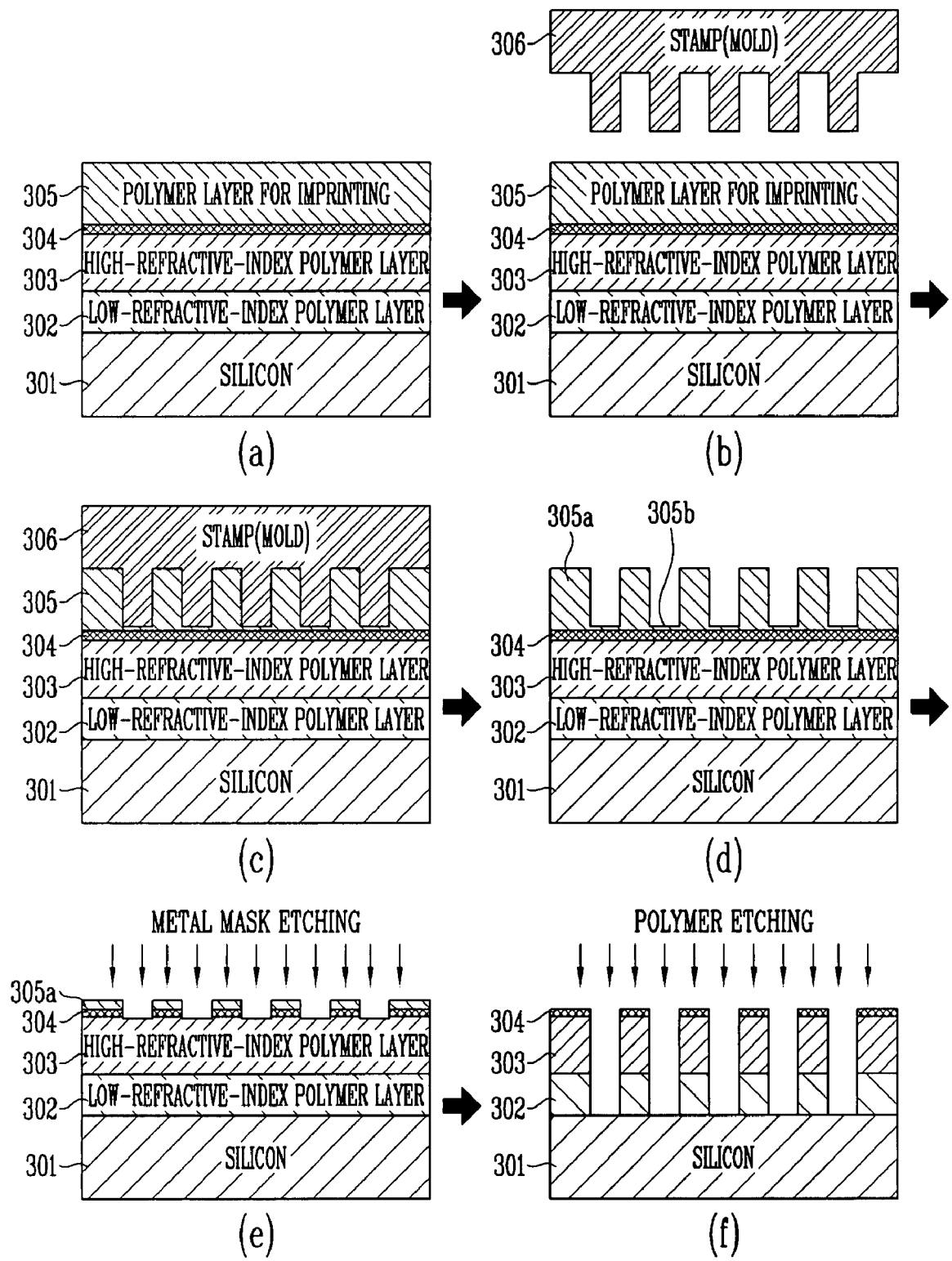
FIG. 3 is a process flowchart showing a method of manufacturing a polymer-based two-dimensional planar photonic crystal superprism device using nanoimprint lithography according to an exemplary embodiment of the present invention.

FIG. 3 is a process flowchart showing a method of manufacturing a polymer-based two-dimensional planar photonic crystal superprism device using nanoimprint lithography according to an exemplary embodiment of the present invention. In general, a polymer-based photonic crystal superprism 22 comprises a silicon layer, a lower clad layer, a core layer, and an upper clad layer. When the two-dimensional planar photonic crystal superprism device 1 is manufactured on the basis of a polymer as illustrated in FIG. 3, it is designed to form a PBG regardless of a small difference in refractive index using a low index contrast photonic crystal that has refractive index distribution using a small difference in refractive index. In particular, a polymer photonic crystal superprism manufactured using nanoimprint (lithography) technology is suggested.

Referring to (a) of FIG. 3, in order to manufacture a polymer-based two-dimensional photonic crystal superprism, first, a polymer having a low refractive index is coated on a silicon substrate 301, thereby forming a low-refractive-index polymer layer 302 to be used as a lower clad layer. At least one of a thermoplastic polymer, a thermosetting polymer and a UV curable polymer having a refractive index of 1.0 to 1.5 is used as the low-refractive-index polymer.

On the low-refractive-index polymer layer 302, a polymer having a high refractive index is coated, thereby forming a high-refractive index polymer layer 303. At least one of a thermoplastic polymer, a thermosetting polymer and a UV curable polymer having a refractive index of 1.4 to 1.8 is used as the high-refractive-index polymer. For example, when the refractive index of the high-refractive-index polymer layer 303 is 1.4, the low-refractive-index polymer 302 can have a refractive index ranging from 1.0 to 1.39. And, when the refractive index of the high-refractive-index polymer layer 303 is 1.8, the low-refractive-index polymer 302 can have a refractive index ranging from 1.0 to 1.5. In other words, the best properties may be obtained when a difference in refractive index between the high-refractive-index layer and the low-refractive-index layer is the largest.

On the high-refractive-index polymer layer 303, a metal mask 304 to be used to etch the high-refractive-index polymer layer 303 is deposited. On the metal mask 304, a polymer layer for imprinting 305 is formed. The polymer layers 302, 303 and 305 are formed by spin-coating for different time periods according to the thicknesses of the respective polymer layers.

Meanwhile, the metal mask 304 formed between the polymer layers may be deposited using a sputtering method, and the deposition thickness of the metal mask 304 is directly associated with the polymer layer for imprinting 305 and the photonic crystal pattern height of a stamp for imprinting 306 to be used in a post-process. In addition, the deposition thickness of the metal mask 304 is determined in consideration of the coating thicknesses, etch ratios, etc., of the high-refractive-index polymer layer 303 and the low-refractive-index polymer layer 302, and the metal mask 304 may be formed thinner than the coated polymer layers. In other words, it is preferable to form the metal mask 304 having a lower etch rate than the polymer layers, to be thin.

Referring to (b) of FIG. 3, the stamp (mold) 306 for thermal/hot or UV nanoimprint lithography is disposed over the polymer layers sequentially stacked in (a) of FIG. 3, i.e., over the polymer layer for imprinting 305. Here, the nanoimprint lithography stamp 306 is disposed over the uppermost disposed polymer layer for imprinting 305 in contact with or separated from the polymer layer for imprinting 305. The nanoimprint lithography stamp 306 is made of silica, polymer, metal, glass and so on.

In the next step, referring to (c) of FIG. 3, the polymer layer for imprinting 305 is hardened and patterned using the nanoimprint lithography stamp 306. Here, when the nanoimprint lithography stamp 306 is for thermal/hot nanoimprint lithography, the high-refractive-index polymer layer 303 is pressurized at 10 to 60 bar in a higher temperature than the glass transition temperature of the high-refractive-index polymer by about 60 to 100° C. When the nanoimprint lithography stamp 306 is for UV nanoimprint lithography, the polymer is hardened by UV radiation, and thus nanoimprint is performed in consideration of hardening characteristics of a UV-hardened polymer. In the UV radiation, a UV light source is used which emits UV light having a wavelength of 280 to 320 nm or 330 to 390 nm according to a generally used polymer material. In addition, the UV light is radiated for a time period of 2 to 60 minutes depending on the thicknesses of the respective spin-coated polymer layers using a power of 3 mW/cm$^2$ to 100 mW/cm$^2$. Here, a pressure of 1 bar or less is applied.

Referring to (d) of FIG. 3, as illustrated in (c) of FIG. 3, the polymer layer is hardened by heat or UV radiation, a polymer photonic crystal pattern 305a is formed on the polymer layer for imprinting 305 by an imprint lithography process, and then the stamp (mold) for imprint lithography 306 is removed from the polymer layer for imprinting 305.

After the stamp 306 is removed, a residual layer 305b of the polymer layer for imprinting remains on the interface of the metal mask 304 inside the polymer photonic crystal pattern 305a. The residual layer 305b of the polymer layer for imprinting remaining inside the photonic crystal pattern is removed by an O$_2$ plasma ashing process. Here, when the viscosity, etc., of material for the polymer layer for imprinting 305 is reduced, it is possible not to leave the residual layer of the polymer layer inside the photonic crystal pattern 305a.

In the next step, referring to (e) of FIG. 3, the metal mask 304 is etched using the photonic crystal pattern 305a as a mask. Here, dry etching and wet etching both can be used. When the metal mask 304 is etched using the photonic crystal pattern 305a, a part of the polymer layer for imprinting 305 is etched together with the metal mask 304 according to the etch selectivity between the metal mask 304 and the polymer layer for imprinting 305.

Referring to (f) of FIG. 3, the high-refractive-index polymer layer 303 and the low-refractive-index polymer layer 302 are etched using the etched metal mask pattern, thereby forming a lower clad layer and a core layer. In the final step, the metal mask pattern 304 remaining on the high-refractive-index polymer layer 303 is removed. According to the above-described procedures, a two-dimensional planar polymer photonic crystal superprism is completed.

Figure 4:
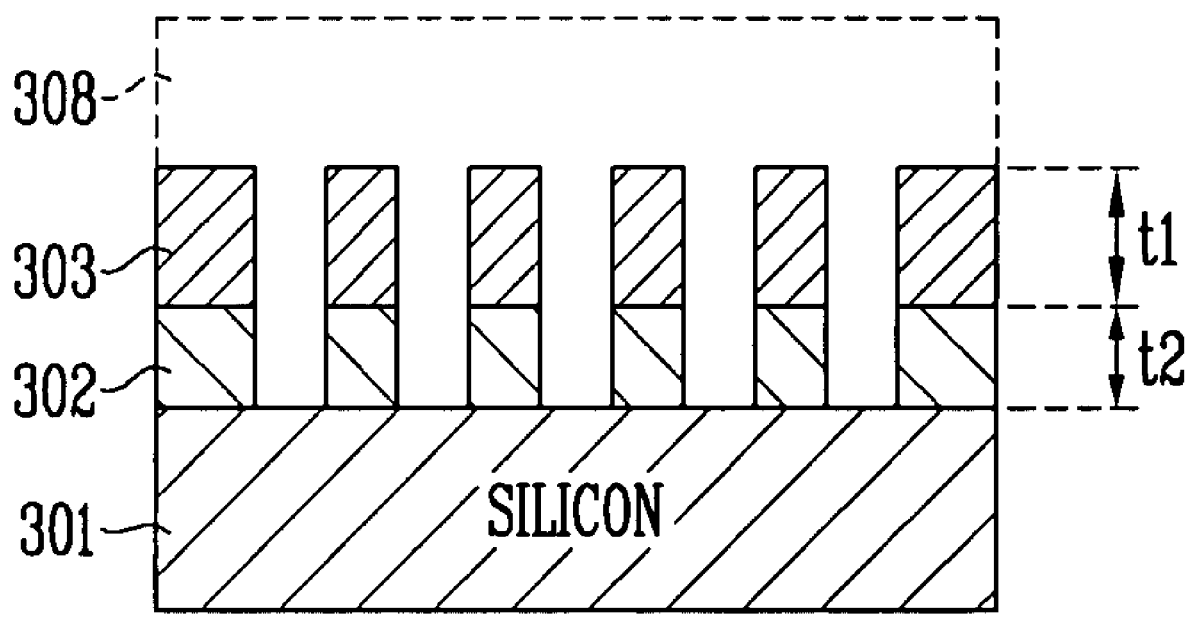
FIG. 4 schematically illustrates the structure of a polymer-based two-dimensional planar photonic crystal superprism according to a first exemplary embodiment of the present invention.

FIG. 4 schematically illustrates the structure of a polymer-based two-dimensional planar photonic crystal superprism according to a first exemplary embodiment of the present invention. Referring to FIG. 4, the polymer-based two-dimensional planar photonic crystal superprism comprises: a silicon substrate 301; a lower clad layer that is a low-refractive-index polymer layer 302 formed by spin-coating a low-refractive-index polymer having a refractive index n of 1.3 or less on the silicon substrate 301; and a core layer that is a high-refractive-index polymer layer 303 formed by spin-coating a high-refractive-index polymer having a refractive index of 1.59 or more on the low-refractive-index polymer layer 302. On the high-refractive-index polymer layer 303 that is the core layer, an upper clad layer 308 comprising an air layer having a lower refractive index than the high-refractive-index polymer layer 303 is formed. Teflon that is a low-refractive-index polymer material is used in the low-refractive-index polymer layer 302. The photonic crystal superprism structure is formed by forming a double polymer layer structure including the low-refractive-index polymer layer 302 and the high-refractive-index polymer layer 303 and then patterning it by a thermal/hot or UV nanoimprint lithography process. In other words, FIG. 4 shows a two-dimensional planar polymer photonic crystal superprism formed according to the manufacturing process of FIG. 3, which comprises: the upper clad layer 308 that is an air layer; the core layer 303 that is a high-refractive-index polymer layer including air holes; and a lower clad layer 302 that is a low-refractive-index polymer layer including air holes.

Figure 5:
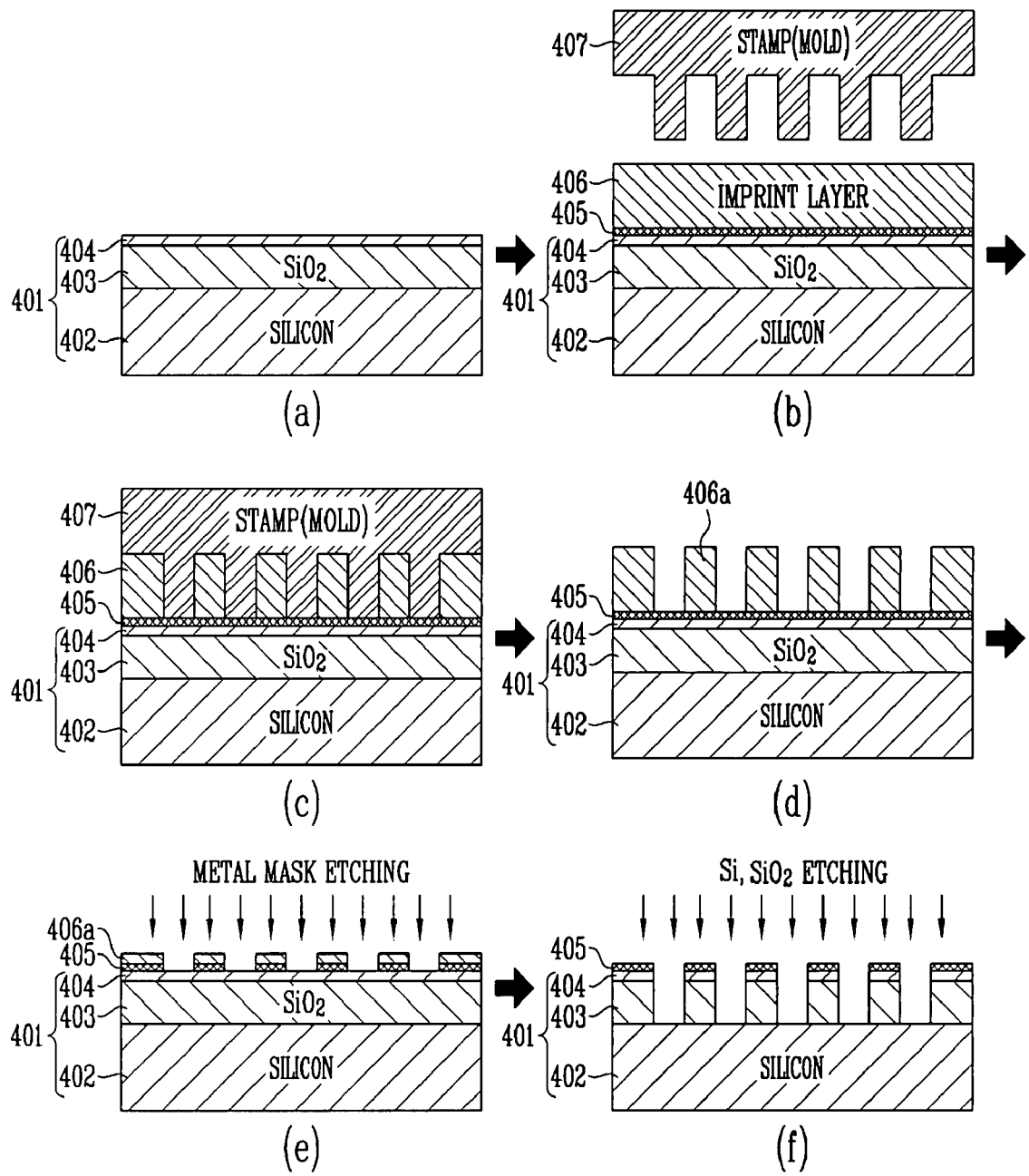
FIG. 5 is a process flowchart showing a method of manufacturing a silicon-on-insulator (SOI)-based two-dimensional planar photonic crystal superprism device using nanoimprint lithography according to an exemplary embodiment of the present invention.

FIG. 5 is a process flowchart showing a method of manufacturing an SOI-based two-dimensional planar photonic crystal superprism device using nanoimprint lithography according to an exemplary embodiment of the present invention. An SOI-based photonic crystal superprism is high index contrast photonic crystal having refractive index distribution using a large difference in refractive index, and is not manufactured using e-beam lithography and a dry etch process but using a nanoimprint lithography technique that is a simple manufacturing process for the purpose of mass production and price-reduction. Referring to FIG. 5, a process of manufacturing a two-dimensional planar photonic crystal superprism using semiconductor material, unlike FIG. 3, is illustrated. The SOI-based two-dimensional planar photonic crystal superprism structure uses compound semiconductor materials, such as GaAs, InP, etc., as well as SOI.

Referring to (a) of FIG. 5, the photonic crystal superprism structure according to this exemplary embodiment uses an SOI wafer 401. The prepared SOI wafer 401 comprises a lower silicon layer 402, a silicon oxide (SiO$_2$) layer 403, and an upper silicon layer 404.

Referring to (b) of FIG. 5, on the SOI wafer 401, a metal mask 405 is deposited. On the metal mask 405, an imprint layer, i.e., imprint resist, 406 is formed. Over the imprint layer 406, a stamp (mold) for thermal/hot or UV nanoimprint lithography 407 is disposed. Here, the stamp for thermal/hot or UV nanoimprint lithography 407 is disposed over the uppermost disposed imprint layer 406 in contact with or separated from the imprint layer 406. The metal mask 405 is deposited using chromium by the sputtering method, and the deposition thickness of the metal mask 405 is directly associated with the photonic crystal pattern height of the stamp for imprint lithography 407 and the thickness of the imprint layer 406. In addition, the thickness of the metal mask 405 is determined in consideration of the thicknesses, etch ratios, etc., of the upper silicon layer 404 and the silicon oxide layer 403 in the SOI wafer 401.

The processes described in (b), (c) and (d) of FIG. 5 are performed in the same order as those described in (b), (c) and (d) of FIG. 3. Thus, detailed descriptions will not be reiterated here, and it is recommended to see (b), (c) and (d) of FIG. 3.

Referring to (e) of FIG. 5, the metal mask 405 is etched using a photonic crystal pattern that is formed of the imprint layer 406 as an etch mask. Here, dry/wet etching is used. When the metal mask 405 is etched using the photonic crystal pattern, a part of the imprint layer 406 is etched together with the metal mask 405 according to the etch selectivity between the metal mask 405 and the imprint layer 406.

In the next step, referring to (f) of FIG. 3, the upper silicon layer 404 and the silicon oxide layer 403 are etched using the etched metal mask pattern. Finally, the metal mask pattern on the upper silicon layer 404 is completely removed, thereby manufacturing the two-dimensional planar SOI-based photonic crystal superprism.

Figure 6:
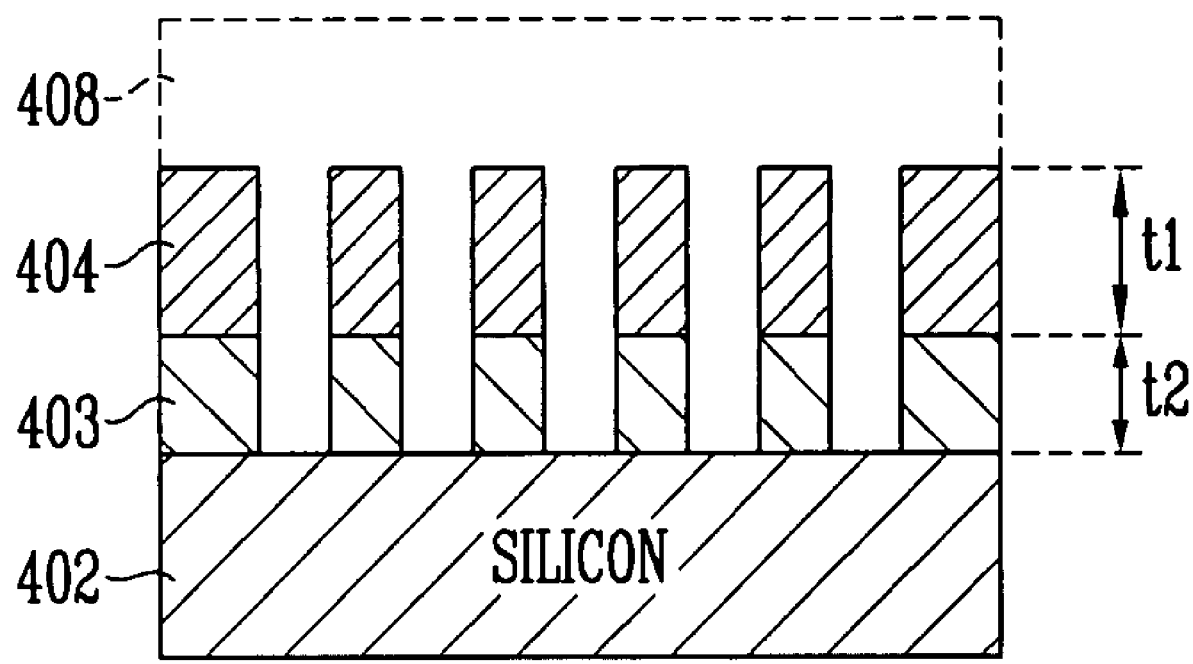
FIG. 6 schematically illustrates an SOI-based two-dimensional planar photonic crystal superprism according to a second exemplary embodiment of the present invention.

FIG. 6 schematically illustrates an SOI-based two-dimensional planar photonic crystal superprism according to a second exemplary embodiment of the present invention. FIG. 6 shows the SOI-based two-dimensional planar photonic crystal superprism device formed according to the manufacturing process of FIG. 5, which comprises: an upper clad layer 408 that is an air layer; a core layer that is an upper silicon layer 404 including air holes and having a refractive index of 3.45; and a lower clad layer that is a silicon oxide layer 403 including air holes and having a refractive index of 1.44.

Figure 7:
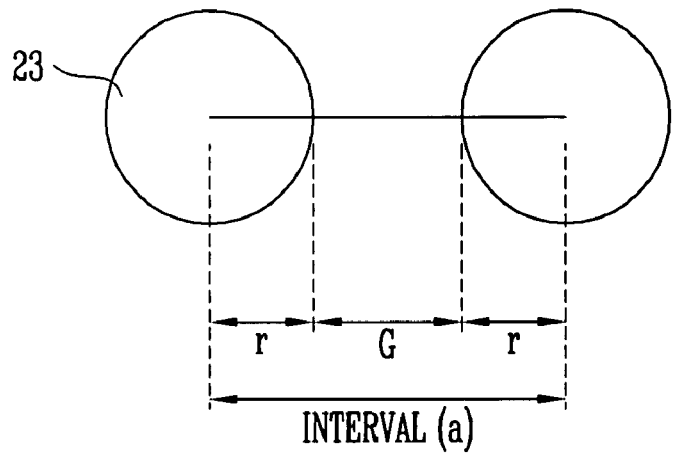
FIG. 7 illustrates the diameter of air holes and an interval between air holes that must be taken into consideration in order to readily copy a nano-pattern when the photonic crystal structure of a two-dimensional planar photonic crystal superprism device is manufactured using nanoimprint lithography.

FIG. 7 illustrates the diameter of air holes and an interval between air holes that must be must be taken into consideration in order to readily copy a nano-pattern when the photonic crystal structure of a two-dimensional planar photonic crystal superprism device is manufactured using nanoimprint lithography. Referring to FIG. 7, a distance between the centers of the adjacent air holes 23 is an interval a. On the basis of the interval a, r denotes the radius of the air holes, and G denotes the distance between adjacent air holes. The air holes 23 may be replaced by a low-refractive-index polymer material. A ratio 2r/G of the diameter 2r of the air holes 23 to the distance G between the air holes 23 must be 55% or less so that a nano-pattern structure in which the air holes 23 are very densely aggregated can be manufactured by imprinting.

When the ratio of the diameter 2r of the air holes 23 to the distance G between the air holes 23 is 55% or more, and an imprinting polymer layer is patterned using a stamp for imprinting, it is not easy to release the stamp from the imprinting polymer layer without damaging a pattern in the case of a structure having a very high pattern density as photonic crystal. In addition, the ratio of the radius (diameter) of the air holes 23 to the distance between the air holes may be changed according to the sizes of the entire pattern and the stamp for imprinting as well as pattern density. And, a high aspect ratio associated with the height of the slab 21 and the depth of the air holes 23 may be 1 to 3 to apply nanoimprint lithography, but may exceed 3 to facilitate the process of manufacturing a photonic crystal slab.

Figure 8:
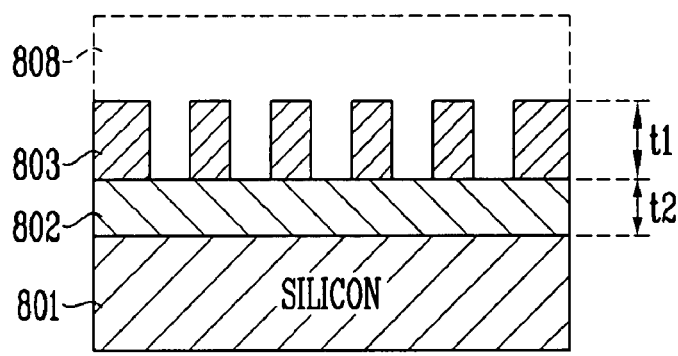
FIG. 8 schematically illustrates the structure of a polymer photonic crystal superprism according to a third exemplary embodiment of the present invention.

FIG. 8 schematically illustrates the structure of a polymer photonic crystal superprism according to a third exemplary embodiment of the present invention. Referring to FIG. 8, a polymer photonic crystal superprism according to the third exemplary embodiment comprises: a low-refractive-index polymer layer 802 that is formed by spin-coating a low-refractive-index polymer on a silicon substrate 801 and is to be a lower clad layer; and a high-refractive-index polymer layer 803 that is to be a core layer of the photonic crystal super-prism and is formed by spin-coating a high-refractive-index polymer on the low-refractive-index polymer layer 802. After the respective layers are stacked as described above, a photonic crystal structure is formed in the high-refractive-index polymer layer 803 using the thermal/hot or UV nanoimprint lithography process. Here, the process conditions of nanoimprint lithography must be optimized so that almost no residual layer remains. The photonic crystal superprism manufactured as described above has a triple-layer structure including air holes of the photonic crystal structure and an upper clad layer 808 formed using an air layer existing on the core layer 803.

Figure 9:
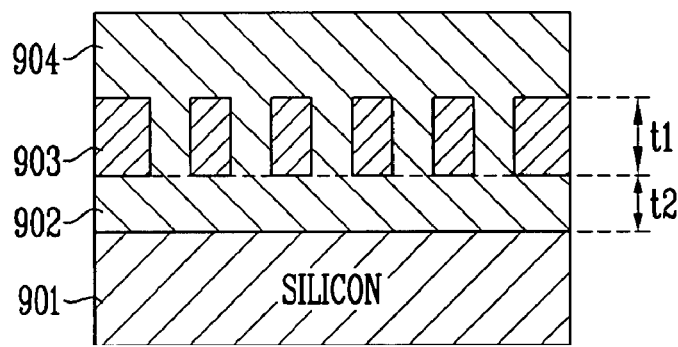
FIG. 9 schematically illustrates the structure of a polymer photonic crystal superprism according to a fourth exemplary embodiment of the present invention.

FIG. 9 schematically illustrates the structure of a polymer photonic crystal superprism according to a fourth exemplary embodiment of the present invention. Referring to FIG. 9, a polymer photonic crystal superprism device according to the fourth exemplary embodiment comprises: a low-refractive-index polymer layer 902, i.e., a lower clad layer, formed by spin-coating a low-refractive-index polymer on a silicon substrate 901; and a high-refractive-index polymer layer 903 that is to be a core layer of the photonic crystal superprism and is formed by spin-coating a high-refractive-index polymer on the low-refractive-index polymer layer 902. A photonic crystal structure is formed in the high-refractive-index polymer layer 903 using the thermal/hot or UV nanoimprint lithography process. After the photonic crystal structure is formed, air holes formed in the high-refractive-index polymer layer 903 are filled with a low-refractive-index polymer by spin-coating the low-refractive-index polymer, and simultaneously a low-refractive-index polymer layer 904 to be an upper clad layer is formed on the high-refractive-index polymer layer 903. Therefore, the two-dimensional planar polymer photonic crystal superprism according to the fourth exemplary embodiment comprises: a low-refractive-index polymer layer 904 that is the upper clad layer; a high-refractive-index polymer layer 903 that is the core layer and is filled with a high-refractive-index polymer; and a low-refractive-index polymer layer 902 that is the lower clad layer.

Figure 10:
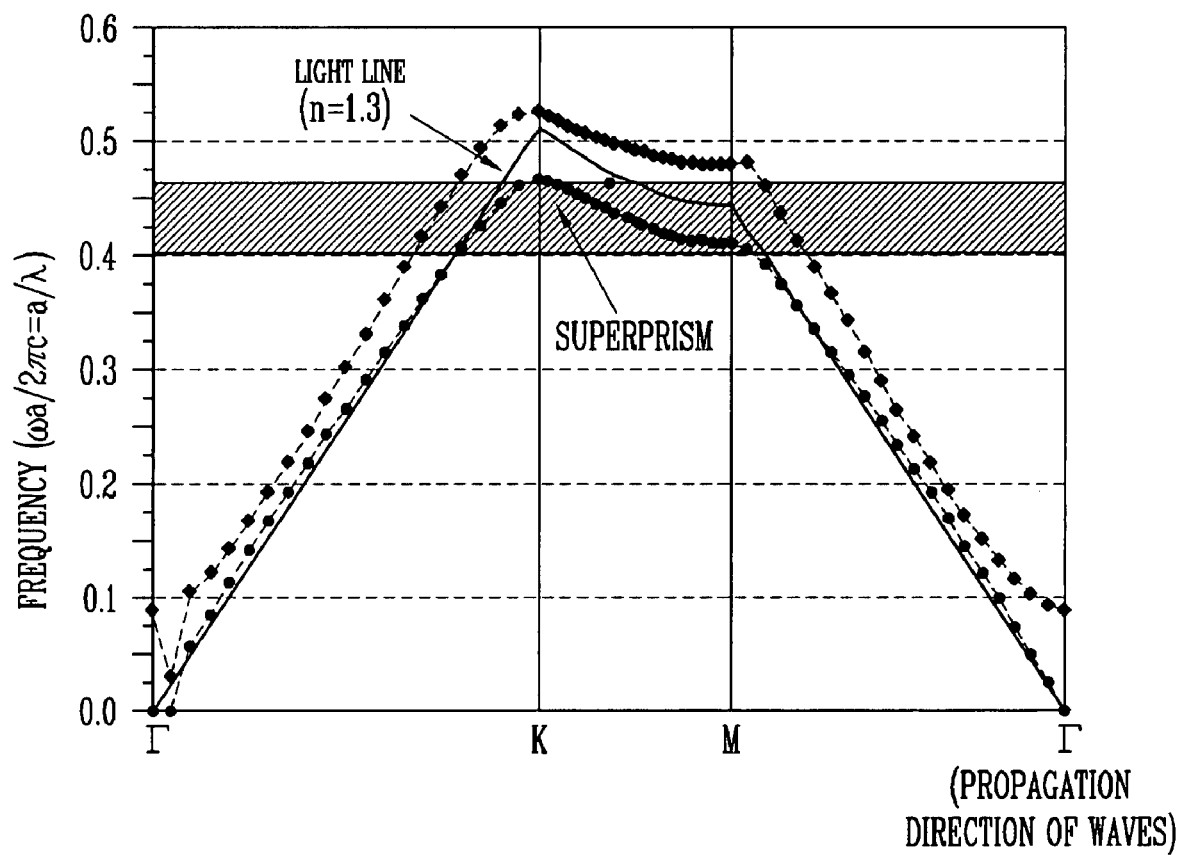
FIG. 10 is a graph showing the photonic band structure of a polymer photonic crystal superprism device according to an exemplary embodiment of the present invention.

FIG. 10 is a graph showing the photonic band structure of a polymer photonic crystal superprism device according to an exemplary embodiment of the present invention. More particularly, FIG. 10 is a photonic band structure diagram of a TE-like mode showing an example of a polymer two-dimensional photonic crystal superprism device structure to which a ratio of the radius of air holes manufactured using a nanoimprint lithography technique to the distance between the air holes is applied, and calculated by a plane wave expansion method. The horizontal axis denotes propagation directions Γ, M and K of waves on the graph, and the vertical axis denotes frequency.

The photonic crystal superprism device used for the photonic band graph has an asymmetric slab structure, i.e., buffer/slab/air. In addition, it is easily manufactured to have an air-bridge structure or a symmetric structure that is a channel structure. The polymer applied to the photonic crystal superprism device is Teflon that is a low-refractive-index polymer and has a refractive index n of 1.3, and polystyrene that is a high-refractive-index polymer and has a refractive index n of 1.59. A photonic crystal structure applied to the photonic crystal superprism device is a hexagonal lattice array having air holes.

FIG. 10 is a result calculated on the assumption that the polymer photonic crystal superprism device is designed to have a slab height $t_1$ of 1.5a (975 nm), a height $t_2$ of 2 m (so that light is sufficiently collected to a core), and an air hole radius r of 0.3a (195 nm). Here, a is a lattice constant. The lattice constant is 650 nm at a wavelength of 1447 nm, an air hole diameter is 390 nm (0.6a), and a wavelength range is 1496 to 1586 nm. The maximum angular dispersion is 3°/nm, and an incident angle is 18° in FIG. 10 and may vary between 5 and 20°. In addition, an angular dispersion may vary between 0.2°/nm and 1.2°/nm. In order to manufacture the above described exemplary embodiments including FIG. 10, the slab height may vary between 1.0a and 2.0a, the air hole radius r may vary between 0.2a and 0.4a, and the lattice constant a may vary between 600 nm and 800 nm. The variables may be combined and applied according to a mutual organic relation.

In the same way as calculating the photonic band structure of a polymer photonic crystal superprism device, the photonic band structure of an SOI-based photonic crystal superprism device can be calculated. The calculation is on the assumption that the SOI-based photonic crystal superprism device is designed to have a slab height $t_1$ of 0.8a (256 nm), a height $t_2$ of 1 μm or more, and the air hole radius r of 0.2a (64 nm). Here, a is a lattice constant. The lattice constant is 320 nm, an air hole diameter is 128 nm (0.4a), and a wavelength range is 1523 to 1542 nm. An appropriate incident angle is 17°, and an angular dispersion is 1.26°/nm. By the calculation, the silicon thickness of the SOI device is determined to be 256 nm.

Through the above-described various exemplary embodiments, it is possible to implement a high-density photonic crystal nano-integrated circuit and a nano-photonic system in which active and passive photonic crystal devices, such as a waveguide, a superprism, a converter, a filter, a switch, a splitter, a coupler, a cavity, a laser, a light emitting device (LED), etc., having various characteristics, are integrated. In addition, as described above, when a photonic crystal superprism device is manufactured, the present invention can be applied for electromagnetic waves in a wide frequency range including visible rays, infrared rays, millimeter waves, microwaves, and radio waves. In particular, the present invention is very likely to be implemented in the infrared region, the millimeter wave region and the microwave region. Furthermore, the present invention can be indispensably applied to develop semiconductor lasers, light emitting diodes, next-generation displays, solar cells, antennas, filters, switches, reflecting mirrors, resonators, heat management devices, etc., improve their performance, and develop new nano-integrated circuits.

According to the present invention, a two-dimensional planar photonic crystal device based on a polymer and compound semiconductor is manufactured using thermal/hot and ultraviolet (UV) imprint lithography techniques corresponding to nano-manufacturing technology, thus facilitating price-reduction and mass production.

According to the exemplary embodiments of the present invention, it is possible to manufacture active and passive photonic crystal devices, such as a waveguide, a superprism, a converter, a filter, a switch, a splitter, a coupler, a cavity, a laser, a light emitting device (LED), etc., having various characteristics. In addition, it is possible to manufacture a photonic crystal nano-system, a photonic crystal circuit and a nano-photonic integrated circuit by integrating or modularizing the single device. It is possible to implement a high-density photonic crystal nano-integrated circuit and a nano-photonic system. Furthermore, it is possible to manufacture a display using a biochemical sensor, a biosensor and a spontaneous emission device having various functions and figures based on a photonic crystal structure, and to manufacture a heat management device using absorption/reflection of light, and so on.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of manufacturing a two-dimensional planar photonic crystal superprism device, the method comprising the steps of:
    forming a lower clad layer made of a polymer on a silicon substrate;
    forming a core layer made of a high-refractive index polymer having a higher refractive index than the polymer on the lower clad layer;
    forming a metal mask and a polymer layer for imprinting on the core layer;
    patterning the polymer layer for imprinting using a stamp or mold to form a mask pattern;
    forming a metal mask pattern using the mask pattern; and
    patterning at least one of the core layer and the lower clad layer to form a photonic crystal lattice pattern including a plurality of air holes.

2. The method of claim 1, wherein in the step of patterning at least one of the core layer and the lower clad layer, the photonic crystal lattice pattern is formed by etching the core layer and the lower clad layer using the metal mask pattern, or the photonic crystal lattice pattern is directly imprinted on the core layer and the lower clad layer using a nanoimprint lithography process.

3. The method of claim 2, wherein in the step of patterning at least one of the core layer and the lower clad layer, a ratio of a diameter of the air holes to a distance between centers of adjacent air holes is adjusted to be 55% or less.

4. The method of claim 3, wherein the ratio of a diameter of the air holes to a distance between centers of adjacent air holes is adjusted according to a size of the whole photonic crystal lattice pattern, a density of the pattern, and a size of the stamp or mold.

5. The method of claim 1, wherein the stamp or mold is made of any one of metal, silicon, quartz and polymer.

* * * * *